April 6, 1954
B. S. HARRINGTON
2,674,179
LIQUID INJECTING APPARATUS
Filed June 23, 1951
2 Sheets-Sheet 1
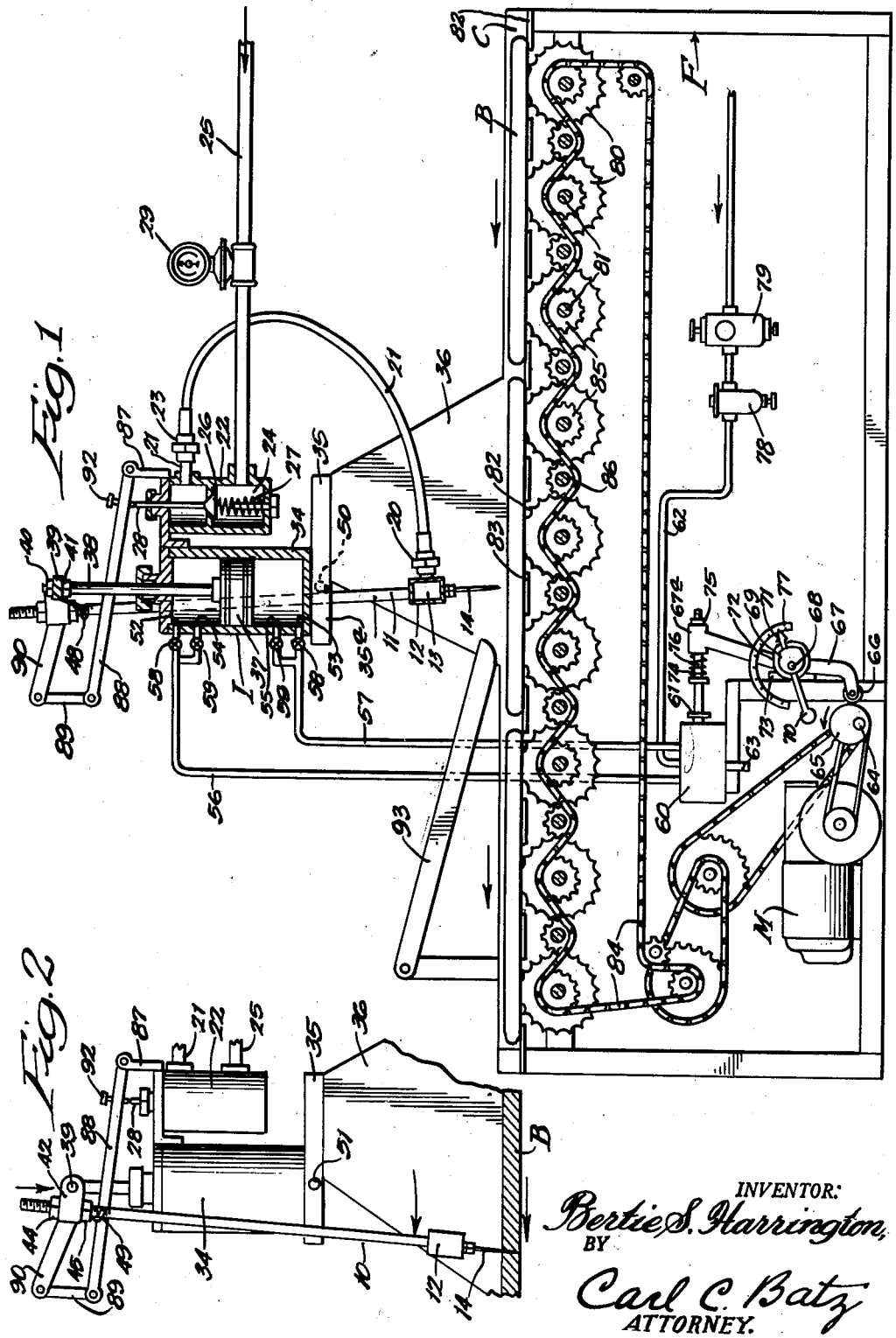
INVENTOR:
Bertie S. Harrington,
BY
Carl C. Batz
ATTORNEY.

April 6, 1954 B. S. HARRINGTON 2,674,179
LIQUID INJECTING APPARATUS
Filed June 23, 1951 2 Sheets-Sheet 2
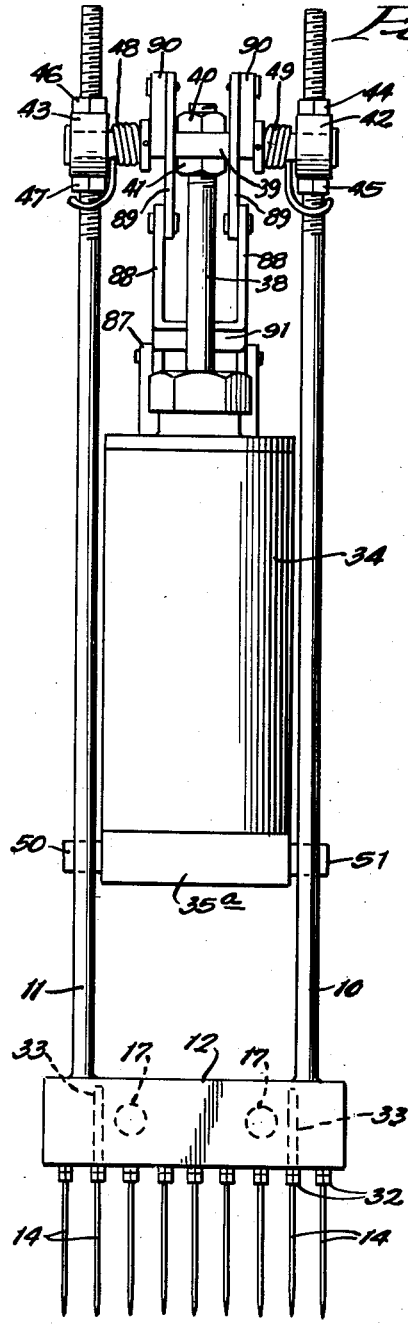
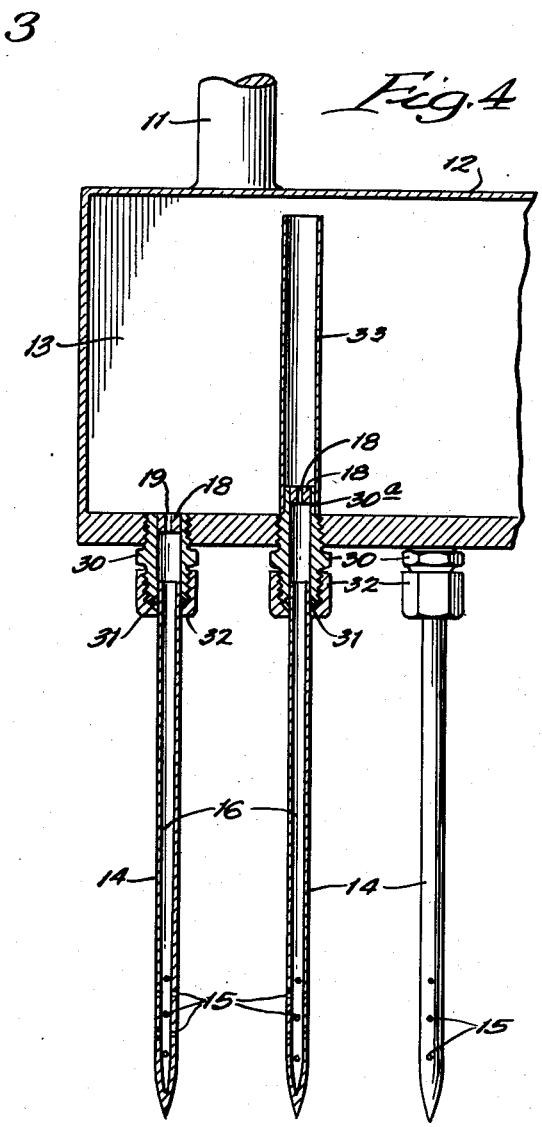
INVENTOR.
Bertie S. Harrington,
BY
Carl C. Batz
ATTORNEY.

Patented Apr. 6, 1954

2,674,179

UNITED STATES PATENT OFFICE 2,674,179

LIQUID INJECTING APPARATUS

Bertie S. Harrington, Chicago, Ill., assignor, by mesne assignments, to The Allbright-Nell Company, a corporation of Illinois Application June 23, 1951, Serial No. 233,177

3 Claims. (Cl. 99—257)

The present invention relates to apparatus for injecting pickling fluid into bacon slabs and its object is to provide an apparatus of this type which is an improvement upon, and has certain advantages over, previously devised apparatus for the same purpose.

My invention is shown in an illustrative embodiment in the accompanying drawings in which—

Figure 1 is a side elevational view of a complete injecting apparatus embodying my invention and showing several of the operational elements in cross section for purpose of clarity with the injection elements in their initial elevated position; Fig. 2, a fragmentary detail view of a portion of the apparatus of Fig. 1 showing the injection elements lowered to engage the bacon slab and in advanced position; Fig. 3, an enlarged front elevational view of the injection elements of Figs. 1 and 2; and Fig. 4, a greatly enlarged fragmentary front view partly in cross section of the needle equipped head member shown in Fig. 3.

In the illustration given, with particular reference to Fig. 1, there is shown a frame F adapted to support a generally horizontal conveyor means C, and injecting elements I above the conveyor means. In the operation of this apparatus, the bacon slabs B are moved continuously along conveyor means C in a predetermined path. As the bacon slabs B pass under the injecting elements I, these elements are operative to uniformly inject pickling fluid into the bacon slabs, as will subsequently be described in detail.

In the illustration given, the injection elements I comprise two pendulum arms 10 and 11 pivotally supported above conveyor C in spaced-apart relation and adapted to oscillate in alignment with the path of travel of the bacon slabs B on conveyor C. A head member 12 providing therein a manifold 13 is carried by arms 10 and 11 at a spaced distance above conveyor C extending across the lower ends thereof as shown more clearly in Fig. 3.

A plurality of injection needles 14 extend downwardly from head 12 towards conveyor C. At the beginning of the injection cycle, as indicated in Fig. 1, the ends of needles 14 are spaced above the path of travel of bacon slabs B. Injection needles 11 are preferably provided with apertures 15 in the lower end portion thereof for the outflow of the pickling fluid, and are provided interiorly with passages 16 communicating between apertures 15 and manifold 13, as shown more clearly in Fig. 4. Manifold 13 is provided with inlet ports 17 as seen in dotted lines in Fig. 3 for supplying pickling fluid under pressure to the manifold. Thus, the pickling fluid supplied to manifold 13 can pass downwardly through passages 16 within the injection needles and out through apertures 15 into the bacon slabs B.

While the manifold and needle structure just described is operative for injecting pickling fluid, it has been found to have a tendency to produce maldistribution of the pickling fluid because of varying resistance to the outflow of fluid through apertures 15 due to the varying texture of the bacon between the relatively lean and relatively fat portions. Thus, the mere introduction of pickling fluid into manifold 13 at a uniform pressure will not assure that a uniform amount of fluid is ejected from each needle. To achieve this desired uniform metering of the fluid, I have found it desirable to interpose between manifold 13 and needle passages 16 flow restricting means adapted to substantially reduce the pressure within the needle passages from that in the manifold. In the illustration given, I employ plug members 18, as seen more clearly in Fig. 4. Plug members 18 provide orifices 19 of restricted cross sectional area compared to the cross sectional area of needle passages 16. Orifices 19 are adapted to greatly reduce the pressure within needle passages 16 from that within manifold 13. It has been found that by having the pressure within manifold 13 several times as great as the pressure within needle passages 16 that a substantially uniform amount of pickling fluid is ejected from each needle during a given time interval even though the needles are embedded in bacon portions providing different amounts of resistance to the outflow of fluid through apertures 15. In actual operation, it has been found advantageous to have the pressure within manifold 13 at from about 50 to 150 pounds per square inch reduced by means of orifices 19 to about 5 to 15 pounds per square inch within passages 16. Orifice diameters of between about .03 to .06 inch have been found satisfactory, and excellent results are achieved when the orifices have diameters of the order of .045 inch. The number of needles depending from head 12 can be varied according to the width of the bacon slabs into which the pickling fluid is to be injected, and more than one row of needles can be employed if desired. When only one row of needles is employed, I have found it desirable to space the needles about one to two inches apart, although this spacing can be considerably varied depending on the amount of fluid that it is desired to inject in the bacon.

Any suitable means can be provided for supplying pickling fluid under pressure to manifold 13. In the illustration given, inlet ports 17 are connected by coupling elements 20 to flexible hoses 21, which extend upwardly to housing 22, being secured thereto by coupling 23 as seen more clearly in Fig. 1. Housing 22 provides interiorly a chamber 24 into which fluid is supplied under pressure through supply pipe 25. Any suitable control valve means can be used to control the flow of fluid from supply pipe 25 into flexible hoses 21. However, it is important that the control valve means employed be adapted to be opened and closed to correspond with the injecting cycle of arms 10 and 11, as will subsequently be described in detail. In the illustration given, there is provided a poppet valve 26 within housing 24. As seen more clearly in Fig. 1, poppet valve 26 is urged to closed position by spring 27 and has a stem 28 extending upwardly to a point above the top of housing 22. Thus, when downward pressure is exerted on the upper end of stem 28 poppet valve 26 is unseated and pickling fluid is allowed to pass through housing 24 into hoses 21. If desired, supply line 25 can be provided with a suitable pressure gauge 29.

Preferably, to permit cleaning of the fluid supply elements, hoses 21 and needles 14 are made removable. In the illustration given, hoses 21 can be detached by unscrewing couplings 20 and 23. As shown more clearly in Fig. 4, needles 14 have their upper end received within sleeve members 30 and are provided therebeneath with an annular bead 31 which abuts the lower end of sleeves 30. The upper end of sleeves 30 is threadedly connected to the bottom of housing 12, and the lower ends are threaded to receive cap members 32 and thereby clamp beads 31 thereto.

A further problem which has arisen in connection with the exhaustion of air from manifold 13 after cleaning, etc. has been solved by providing at least one of the needles 14 with a standpipe 33, as shown in Fig. 4. In the illustration given, standpipe 33 has one end secured about an inward extension 30a of sleeve 30 and extends upwardly therefrom to a point closely spaced from the top of manifold 13. Thus, by this means any air or other gas within manifold 13 is forced outwardly through standpipe 33 and the needle communicating therewith instead of remaining in the upper portion of the manifold.

In order for arms 10 and 11 to move through their desired operational cycle, it is necessary that in addition to their being adapted to oscillate in alignment with the path of travel of the bacon slabs that they also be adapted to move toward and away from this path of travel for embedding and withdrawing needles 14. Any suitable means can be provided for raising and lowering arms 10 and 11 without interfering with the pivotal action of these arms which can be adapted to embed needles 14 in bacon slabs 13 in the lower positions of arms 10 and 11 and to elevate needles 14 above the bacon slabs in the upper positions of the arms. Preferably, I prefer to employ a cylinder having a piston actuated by compressed gas such as air. In the illustration given, cylinder 34 is supported at a spaced distance above conveyor C on platform 35 extending between side members 36 of frame F. Within cylinder 34 is a reciprocally mounted piston 37 having a piston rod 38 extending upwardly for a distance above cylinder 34 even when piston 37 is in its downwardmost position.

Any suitable means can be provided for pivotally connecting piston rod 38 to arms 10 and 11. In the illustration given, there is provided a transverse rod 39 rigidly secured to the upper end of piston rod 38 and extending laterally in both directions to points beyond the sides of the forward projection 35a of platform 35, as shown more clearly in Fig. 3. If desired, the upper end of piston rod 38 can be threaded and adjustably locked to transverse rod 39 by nuts 40 and 41. On the outer ends there is pivotally mounted attachment blocks 42 and 43 which extend forwardly, as seen in Figs. 1 and 2. The forward portions of attachment blocks 42 and 43 are bored to slidably receive the threaded upper ends of pendulum arms 10 and 11 which are adjustably positioned therein by means of nuts 44, 45, 46 and 47. Thus, arms 10 and 11 are free to oscillate on each side of platform portion 35a while being raised and lowered by piston rod 38.

From the above description, the contemplated cycle of operation of arms 10 and 11 will begin to become apparent. Briefly, this cycle begins with the downward movement of arms 10 and 11 to embed needles 14 in a bacon slab. Upon the needles becoming embedded, the forward motion of the bacon slab swings arms 10 and 11 forwardly along the path of travel of the bacon. After the arms 10 and 11 have followed the bacon slab for a short distance, the arms are raised to elevate the needles 14 above the bacon slab so that the arms can return to their initial position. It will be apparent that the arms can be positioned initially so that they will be displaced a greater distance from dead center by following the bacon slabs and will therefore swing back to their initial position under the influence of gravity. To achieve a more positive action, however, I prefer to use mechanical means such as springs to assist in returning the arms. It is also desirable to provide means for maintaining the arms in suitable starting positions until they are again lowered to embed the needles within the bacon. In the illustration given there is provided torsion springs 48 and 49 which are coiled about and locked to the outer portions of transverse rod 39, and have one end hooked about arms 10 and 11. Springs 48 and 49 are thus effective in normally urging arms 10 and 11 in the opposite direction from the direction of movement of the bacon slabs along conveyor C, while being yieldable when the needles are embedded in the bacon slabs so that the arms can be pulled forwardly to follow the bacon slabs during the injection of the pickling fluid. There is also provided stop members 50 and 51 extending outwardly from the sides of platform 35 at the rear of platform portion 35a. Thus, springs 48 and 49 in cooperation with stop members 50 and 51 are effective in holding arms 10 and 11 in their initial or starting position, as shown in Fig. 1.

Any suitable means can be provided for reciprocating piston 37. However, it is preferred that the means employed be adapted to provide reciprocation speeds of the order of 60 strokes per minute, or one complete cycle up and down per second. To accomplish this result, I have found it desirable to have the ends of cylinder 34 well cushioned. This can be accomplished by providing inlet ports 52 and 53 at the ends of cylinder 34, as shown in Fig. 1. Outlet ports 54 and 55 are provided spaced from the ends of cylinder 34 and the inlet ports. Pipes 56 and 57 are each connected to one pair of inlet and outlet ports. The portion of the lines leading to inlet ports 52 and 53 is equipped with inflow check valves 58, while the portion of the pipes leading to the outlet ports is equipped with needle valves 59. The result of this pipe and valve structure is to cause the air to be primarily admitted through ports 52 and 53, while it is entirely exhausted through ports 54 and 55. Thus, piston 37 is prevented from moving completely to the ends of cylinder 34 by the cushioning action due to the compression of air after the piston passes the outlet ports 54 and 55, depending on which direction it is traveling.

While a variety of means may be employed for controlling the inflow and outflow of air through lines 56 and 57, I prefer to employ an ordinary commercial 4-way air valve 60, as illustrated in Fig. 1. Since the construction of such air valves is well-known, it is believed that it will not be necessary to describe its construction in detail herein. The type of air valve which it is desired to employ in conjunction with my apparatus is equipped internally with a slidably mounted spool (not shown) which is connected to an externally extending plunger 61. The spool within valve 60 is provided with a plurality of passages so that in one position it allows the air to travel from air inlet line 62 through valve 60 and into pipe 56, while at the same time the air is permitted to travel out through line 57 through valve 60 and exhausted through vent line 63. It is preferred that the valve 60 be adapted so that it is necessary to slightly depress plunger 61 to produce the passage alignment just referred to, since in this position arms 10 and 11 will be moved downwardly. Also, plunger 61 and the spool within valve 60 are preferably spring biased so that they are normally in the opposite position to that described and in which the passages are aligned to allow air to pass from line 62 into line 57, while air is being forced out through line 56 and exhausted through vent 63. Thus, valve 60 can effectively control the reciprocation of piston 37.

Any suitable means can be provided for actuating valve 60 by pressing plunger 61 inwardly from its normal position to produce the downward movement of piston 37, and thereby embed the needles 14 in the bacon slab. However, since the period of dwell of the needles within the bacon slab can be made to determine the quantity of pickling fluid injected into the bacon per cycle, it is desired that means be provided for operating valve 60 which can be adjusted to produce varying periods of dwell by varying the length of time within each cycle during which plunger 61 is depressed. One simple and very excellent device for accomplishing this result is illustrated in Fig. 1. A motor M, which is also used to drive conveyor C, by belt and pulley means drives shaft 64. Preferably shaft 64 is driven at a uniform rotational speed, which can advantageously be at about one revolution per second. Thus, cam member 65 through cam follower 66 rocks crank arm 67, which is pivoted on pin 68. A circular hub member 69 is eccentrically mounted on the outer end of pin 68 and has secured thereto an adjustment arm 70 aligned with an indicator head 71. Hub 69 is rotatably mounted within sleeve member 72 which is rigidly mounted on frame F by attachment bracket 73. Thus, by the rotation of hub 69 by means of adjustment arm 70 pin 68 upon which crank arm 67 pivots can be moved to varying positions with respect to attachment bracket 73. This has the effect of moving the upper end 67a of crank arm 67 to different positions with respect to plunger 61. A head equipped stem 74 is slidably mounted in the upper end 67a and retained therein by nut 75 of crank arm 67 in alignment with plunger 61 so as to contact plunger 61 when rocked to the left, as viewed in Fig. 1. A compression spring 76 is secured about stem 74 to normally maintain the stem fully extended towards plunger 61. By this means, after stem 74 moves plunger 61 inwardly sufficiently to realign the passages within valve 60 and embed needles 14 in the bacon slab, spring 74 can be compressed to maintain this valve passage alignment for differing periods of time depending on the relation of pin 68 to cam 65. If desired, an appropriately graduated scale 77 can be provided to assist in setting the valve actuating mechanism to produce different periods of dwell of the needles in the bacon slabs. In actual operation, it has been found that the dwell can be varied by this means from 5 to 80% of the complete cycle. In other words, if cam 64 is rotated at one revolution per second, the adjustment of pin 68 can vary the period of dwell from $5/100$ to $80/100$ of a second and thus govern directly the amount of pickling fluid injected in the bacon slabs for any selected size of orifices and manifold pressure.

If desired, there can be provided in air supply line 62 an air lubricator 78 and a pressure regulator 79.

Any suitable means can be provided for driving conveyor C. Preferably, however, the driving means is adapted to run in synchronism with cam 65, since the speed of movement of the bacon slabs along the conveyor controls the spacing between each line of embedment of the needles. Also, it is desirable that the conveyor means be adapted to prevent any tendency of the bacon slabs to slide backwardly on the conveyor upon being engaged by the needles. In the illustration given, these results are accomplished by providing a plurality of feed wheels 80 having serrated peripheries adapted to engage the bacon slabs rotatably mounted on shafts 81 beneath bed 82 and extending upwardly through slots 83 in bed 82. In the illustration given, feed wheels 81 are driven by chain 84 passing alternately over driving sprockets 85 and guide sprockets 86, as illustrated in Fig. 1. Chain 84 is in turn driven by a chain and sprocket power take-off from shaft 64.

Any suitable means can be provided for operating valve 26. It is preferred, however, to have the operating means for valve 26 adjustable, so that the timing of the opening and closing of the valve can be varied. It will be apparent that by varying the timing of the opening and closing of the valve that the depth of the needles within the bacon slab at which the injection of fluid begins and ends can be controlled. For example, valve 26 can be made to open from ⅛ to 1″ before piston 37 leaves the bottom of the stroke at which point the needles 14 are most deeply embedded in the bacon slabs. In the illustration given, there is provided a simple and accurate valve operating means which is readily adjustable. Extending upwardly from the top of housing 22 there is provided two spaced supports 87. To the upper ends of support 87 are pivotally connected a double hinged linkage of actuating levers comprising forwardly extending lever members 88, upwardly extending lever members 89 and rearwardly extending lever members 90. As seen more clearly in Fig. 3, the rear ends of lever members 90 are rigidly connected to transverse rod 39 so that as piston rod 38 moves upwardly and downwardly, lever members 88 move toward and away from the upper end of valve stem 28. A strap member 91 extends between lever members 88 above stem 28. A head equipped actuating pin 92 is threadedly mounted within strap 91 in alignment with the upper end of stem 28. Thus, pin 92 can easily be adjusted to vary the timing of the opening and closing of valve 26.

In order to prevent the bacon slabs from riding upwardly above track 82 as the needles 14 are removed therefrom, it is desirable to provide hold-down arms, such as arms 93, as seen in Fig. 1.

Operation

The operation of the injecting apparatus of my invention, which will be largely apparent from the foregoing description, can be briefly summarized as follows: The bacon slabs B are fed from left to right at a constant rate, as viewed in Fig. 1, on conveyor track C. As the bacon slabs pass under the injecting elements I, pickling fluid is injected therein through needles 14. To accomplish this, cam 65 actuates crank 67 so that it depresses plunger 61 and aligns the passages in valve 60 to produce an inflow of air through line 56 and an outflow through line 57. This causes piston 37 to move downwardly, and thereby embeds needles 14 in the bacon slabs. The position of arms 10 and 11 during the downward movement is indicated in Fig. 1. After the needles 14 have entered the bacon slabs, actuating pin 92 depresses valve stem 28 and allows the pickling fluid to be supplied under pressure to manifold 13 from which it is forced out through needles 14 into the bacon slabs. Arms 10 and 11 are then oscillated forwardly by the movement of the bacon slabs during the period of dwell of the needles within the slabs. Such advanced position is illustrated in Fig. 2. After traveling along with the bacon for a short time, cam 65 effects the disengagement of the head of stem 74 with plunger 61, and thus allows the passages within valve 60 to be returned to their original alignment. Air then passes inwardly through line 57 and outwardly through line 56 to effect the elevation of arms 10 and 11 and the consequent removal of needles 14 from the bacon slabs. As the needles are being removed from the bacon slabs, actuating pin 92 is disengaged from valve stem 28, permitting the valve to close under the action of spring 27. Arms 10 and 11 are then swung backwardly to their starting position by springs 48 and 49 and are held in this position against stop members 50 and 51 in readiness for the next injecting cycle.

It will be apparent from the above discussions that the operation of my apparatus contemplates the impressing of a definite cyclical pattern on the operation of arms 10 and 11. For example, arms 10 and 11 may be caused to move through one complete cycle per second. As explained above, when the orifices 19 are of a given restricted size and when the pressure in manifold 13 is maintained constant, the amount of fluid ejected from each needle is substantially constant even though the resistance of the material surrounding the needles varies considerably. Thus, it is possible to control the amount of fluid injected into the bacon by controlling the period of dwell within each cycle. This is accomplished, as explained above by varying the setting of eccentric pin 68 so as to maintain plunger 61 of air valve 60 in its inward position for varying periods within the cycle time established by the rotational speed of cam 65. It can thus be seen that my apparatus can be adjusted to produce an extremely accurate and uniform metering of the pickling fluid.

While in the foregoing specification, I have described a particular embodiment of my invention to illustrate its application to the injection of pickling fluid into bacon slabs, it will be apparent to those skilled in the art that many of these details can be varied widely without departing from the spirit of my invention. For example, while I have described my apparatus mainly in connection with the injection of pickling fluid into bacon slabs, it will be apparent that it can also be adapted for injecting a wide variety of liquids into pierceable, permeable bodies as they move continuously along a predetermined path.

I claim:

1. In an apparatus for injecting pickling liquid into hog bellies or the like, the combination comprising conveyor means for moving the bellies continuously along a predetermined substantially horizontal path, a pendulum arm pivotally supported above said path and adapted to oscillate in alignment therewith, a head member providing a manifold and carried by said arm at a spaced distance above said path, a plurality of laterally spaced injection needles extending downwardly from said member, said needles having discharge apertures and passages providing communication between said apertures and said manifold, means for lowering and raising said arm in order to embed said needles in a subjecent bacon slab in the lower position of said arm and to elevate said needles above said slab in the upper position of said arm, means for supplying pickling liquid under pressure to said manifold, said last mentioned means including a control valve cooperating with said lowering and raising means to open and close said valve in synchronism with the movements thereof, yieldable spring means for returning said arm to an initial position after it is swung by the movement of said subjacent belly and subsequently elevated above said path, stop means cooperating with said yieldable spring means in maintaining said arm in a starting position for the beginning of each injection cycle, and a standpipe disposed within said manifold and having one end communicating with the top of said manifold and its other end communicating with one of said needle passages, whereby any gas that collects within the manifold is exhausted through said standpipe before the admission of pickling liquid thereto.

2. In an apparatus for injecting pickling liquid into bacon slabs or the like as they move continuously in one direction along a predetermined path, the combination comprising an arm supported above said path, a head member providing a manifold and carried by said arm at a spaced distance above said path, a plurality of laterally spaced injection needles extending downwardly from said head member, and having discharge apertures and passages providing communication between said apertures and said manifold, tubular plug members interposed between said manifold and said needles and providing orifices of such restricted cross sectional area as greatly to reduce the pressure within said needle passages from that in said manifold, means for supplying pickling liquid under pressure to the manifold, means for lowering and raising said arm in order to embed said needles in a subjacent bacon slab and to elevate said needles above said slab, and an upstanding standpipe disposed within the manifold, having one end communicating with the top of said manifold and its other end communicating with one of said needle passages, and adapted to exhaust through the one needle passage any gas that collects within the manifold prior to the admission of pickling liquid thereto.

3. An apparatus adapted to inject pickling liquid into a bacon slab or the like and comprising a frame structure, a slab supporting member and a manifold-forming head member mounted on the frame structure so that the head member directly overlies the supporting member and one of the members is movable to and from the other member, a plurality of laterally spaced injection needles extending downwards from said head member and having discharge apertures in their lower ends and passages providing communication between said apertures and the manifold, means for supplying pickling liquid under pressure to the manifold, mechanism for moving said one member to and from the other member in order to effect successive penetration and removal of the needles with respect to the slab on the supporting member, and an upstanding standpipe disposed within the manifold, having one end thereof communicating with the top of said manifold and its other end communicating with one of the needle passages, and adapted to exhaust through the one needle passage any gas that collects within the manifold prior to the admission of pickling liquid thereto.

References Cited in the file of this patent

UNITED STATES PATENTS

| Number | Name | Date |
| --- | --- | --- |
| 194,569 | Alberger | Aug. 28, 1877 |
| 1,494,174 | Lane | May 13, 1924 |
| 2,466,772 | Kenyon | Apr. 12, 1949 |
| 2,503,147 | Applezweig | Apr. 4, 1950 |
| 2,520,719 | Hanson | Aug. 29, 1950 |
| 2,587,024 | Avery | Feb. 26, 1952 |

FOREIGN PATENTS

| Number | Country | Date |
| --- | --- | --- |
| 502,486 | Germany | July 11, 1930 |